US012811063B2

(12) United States Patent
Asai et al.

(10) Patent No.: US 12,811,063 B2
(45) Date of Patent: Nov. 24, 2026

(54) MULTILAYER CERAMIC ELECTRONIC DEVICE

(71) Applicant: TAIYO YUDEN CO., LTD., Tokyo (JP)

(72) Inventors: Takashi Asai, Tokyo (JP); Yoichi Kato, Tokyo (JP); Tomoyasu Eguchi, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 283 days.

(21) Appl. No.: 18/617,235

(22) Filed: Mar. 26, 2024

(65) Prior Publication Data

US 2024/0331945 A1 Oct. 3, 2024

(30) Foreign Application Priority Data

Mar. 31, 2023 (JP) ................................ 2023-058916

(51) Int. Cl.
*H01G 4/232* (2006.01)
*H01G 4/30* (2006.01)

(52) U.S. Cl.
CPC ............. *H01G 4/2325* (2013.01); *H01G 4/30* (2013.01)

(58) Field of Classification Search
CPC ............................... H01G 4/2325; H01G 4/30
See application file for complete search history.

(56) References Cited

U.S. PATENT DOCUMENTS

2001/0043454 A1* 11/2001 Yoshii .................... H01G 4/232 361/321.2
2007/0057237 A1* 3/2007 Ohtani ...................... C03C 8/18 252/500
2011/0236658 A1* 9/2011 Motoki ................ H01G 4/2325 428/213
2012/0319536 A1* 12/2012 Sakuratani ............... H01G 4/30 310/366
2013/0033154 A1* 2/2013 Sakuratani ............... H01G 4/30 310/366
2017/0301469 A1 10/2017 Juhng et al. ............. H01G 4/30
2018/0182552 A1* 6/2018 Sawada .................. H01G 4/232
2019/0355518 A1* 11/2019 Harada ..................... H01G 4/30
2021/0183576 A1* 6/2021 Song ...................... H01G 4/232
2022/0013291 A1* 1/2022 Nishisaka ............ H01G 4/1227
2022/0013293 A1 1/2022 Nishisaka et al. ....... H01G 4/30

FOREIGN PATENT DOCUMENTS

JP 2017-195359 A 10/2017
JP 2022-014532 A 1/2022

* cited by examiner

*Primary Examiner* — Michael P McFadden
(74) *Attorney, Agent, or Firm* — Stein IP, LLC

(57) ABSTRACT

A multilayer ceramic electronic device includes an element body and external electrodes. At least one of the pair of external electrodes includes a first metal layer and a second metal layer. The first metal layer covers a part of internal electrodes and a first portion of cover dielectric layers and side margin sections which is located on a side of the internal electrodes, does not cover a second portion of the cover dielectric layers and the side margin section which is other than the first portion, contacts a part of the internal electrodes, and has a main component of nickel or copper, at a corresponding end face of the element body. The second metal layer covers the first metal layer, contacts at least a part of the second portion on a side of the first metal layer, and has a main component of tin.

11 Claims, 14 Drawing Sheets

MULTILAYER CERAMIC ELECTRONIC DEVICE

CROSS-REFERENCE TO RELATED APPLICATION

This application is based upon and claims the benefit of priority of the prior Japanese Patent Application No. 2023-058916, filed on Mar. 31, 2023, the entire contents of which are incorporated herein by reference.

FIELD

A certain aspect of the present disclosure relates to a multilayer ceramic electronic device.

BACKGROUND

In multilayer ceramic electronic devices such as multilayer ceramic capacitors, it is known to provide an uncovered area where an internal nickel electrode layer is not covered by an external nickel electrode layer, and to provide an external copper electrode layer in the uncovered area (for example, Japanese Patent Application Publication No. 2022-14532). A structure in which the external electrode does not cover the side surface of the side margin portion is known (for example, Japanese Patent Application Publication No. 2017-195359).

SUMMARY OF THE INVENTION

According to an aspect of the embodiments, there is provided a multilayer ceramic electronic device including: an element body including a multilayer body in which a plurality of internal electrodes and a plurality of dielectric layers are alternately stacked in a first direction, a pair of cover dielectric layers sandwiching the multilayer body in the first direction, and a pair of end faces facing each other in a second direction to which the plurality of internal electrodes are alternately exposed, the plurality of dielectric layers including a pair of side margin sections sandwiching the plurality of internal electrodes in a third direction orthogonal to the first direction and the second direction; and a pair of external electrodes respectively covering each of the pair of end faces, wherein at least one of the pair of external electrodes includes a first metal layer and a second metal layer, wherein the first metal layer covers a part of the plurality of internal electrodes and a first portion of the pair of cover dielectric layers and the pair of side margin sections which is located on a side of the plurality of internal electrodes, does not cover a second portion of the pair of cover dielectric layers and the pair of the side margin section which is other than the first portion, contacts a part of the plurality of internal electrodes, and has a main component of nickel or copper, at a corresponding end face of the element body, and wherein the second metal layer covers the first metal layer, contacts at least a part of the second portion on a side of the first metal layer, and has a main component of tin.

According to another aspect of the embodiments, there is provided a multilayer ceramic electronic device including: an element body including a multilayer body in which a plurality of internal electrodes and a plurality of dielectric layers are alternately stacked in a first direction, a pair of cover dielectric layers sandwiching the multilayer body in the first direction, and a pair of end faces facing each other in a second direction to which the plurality of internal electrodes are alternately exposed, the plurality of dielectric layers including a pair of side margin sections sandwiching the plurality of internal electrodes in a third direction orthogonal to the first direction and the second direction; and a pair of external electrodes respectively covering each of the pair of end faces, wherein at least one of the pair of external electrodes includes a first metal layer and a second metal layer, wherein the first metal layer covers a part of the plurality of internal electrodes and a first portion of the pair of cover dielectric layers and the pair of side margin sections which is located on a side of the plurality of internal electrodes, does not cover a second portion of the pair of cover dielectric layers and the pair of the side margin section which is other than the first portion, and contacts a part of the plurality of internal electrodes, at a corresponding end face of the element body, and wherein the second metal layer covers the first metal layer, contacts at least a part of the second portion on a side of the first metal layer, and has a Young's modulus smaller than that of the first metal layer.

DETAILED DESCRIPTION

When a multilayer ceramic electronic device is mounted on a mounting board, if stress is concentrated at the end where the external electrode contacts the element body, problems such as cracks in the element body or peeling of the external electrodes may occur.

Hereinafter, an exemplary embodiment will be described with reference to the accompanying drawings.

Figure 1:
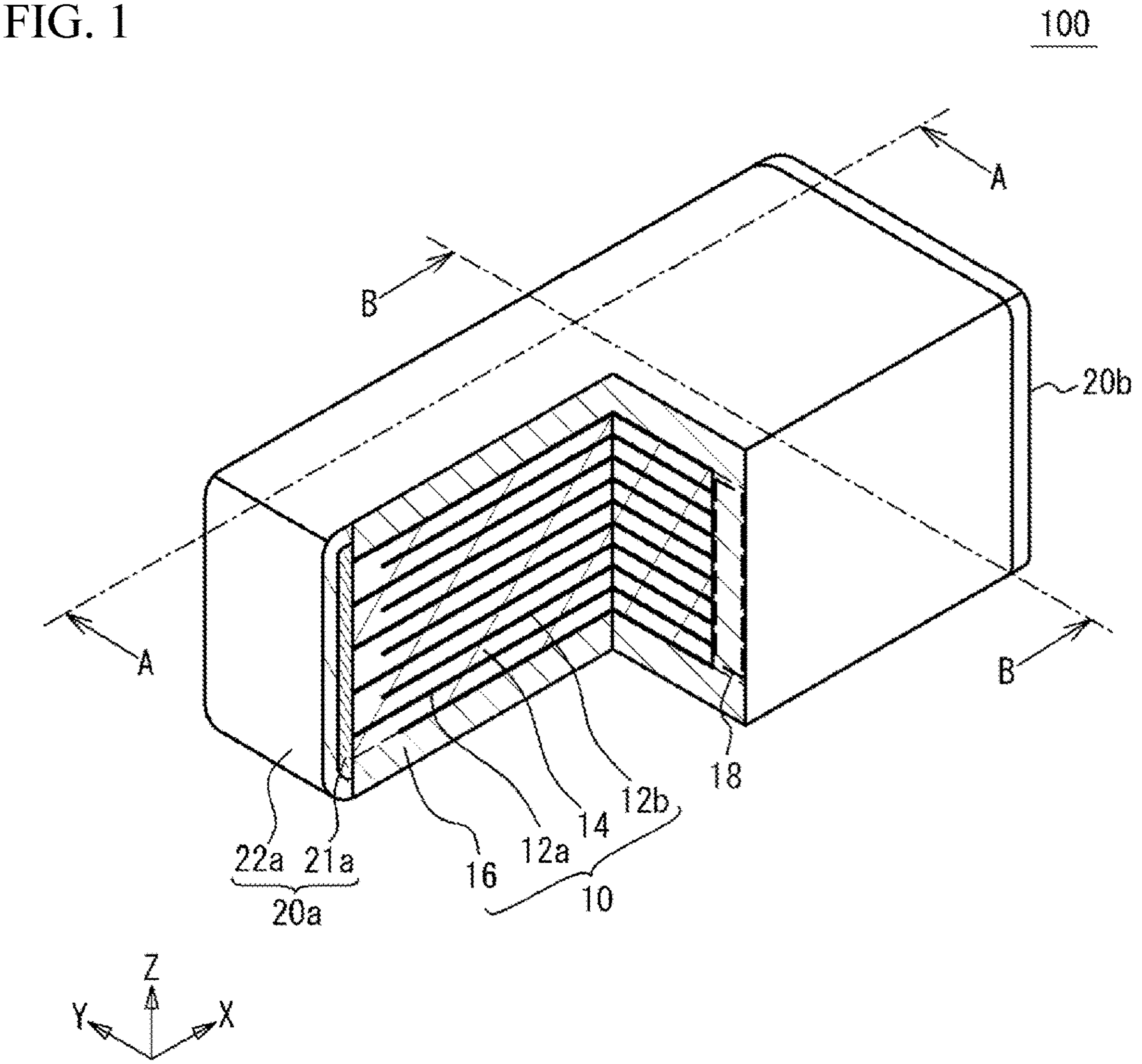
FIG. 1 is a partially sectional perspective view of a multilayer ceramic capacitor according to an embodiment.
Figure 2:
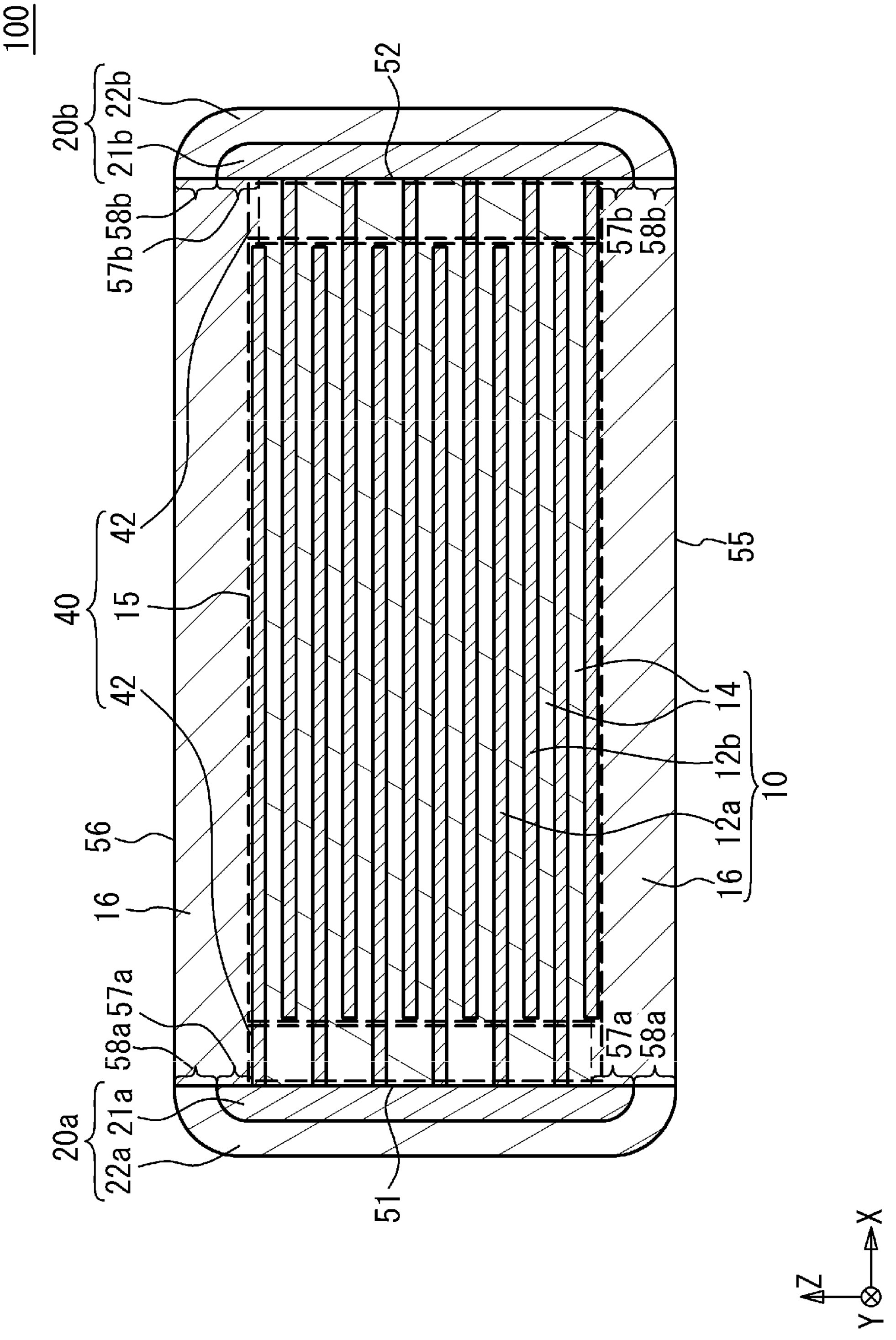
FIG. 2 is a cross-sectional view taken along a line A-A in FIG. 1.
Figure 3:
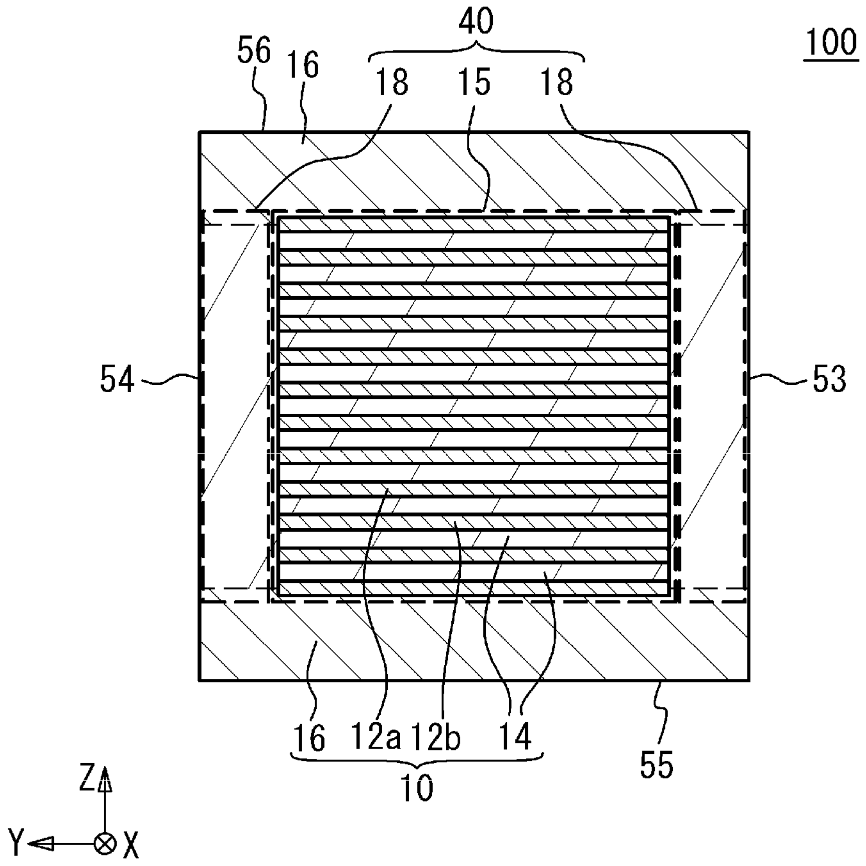
FIG. 3 is a cross-sectional view taken along a line B-B in FIG. 1.
Figure 4:
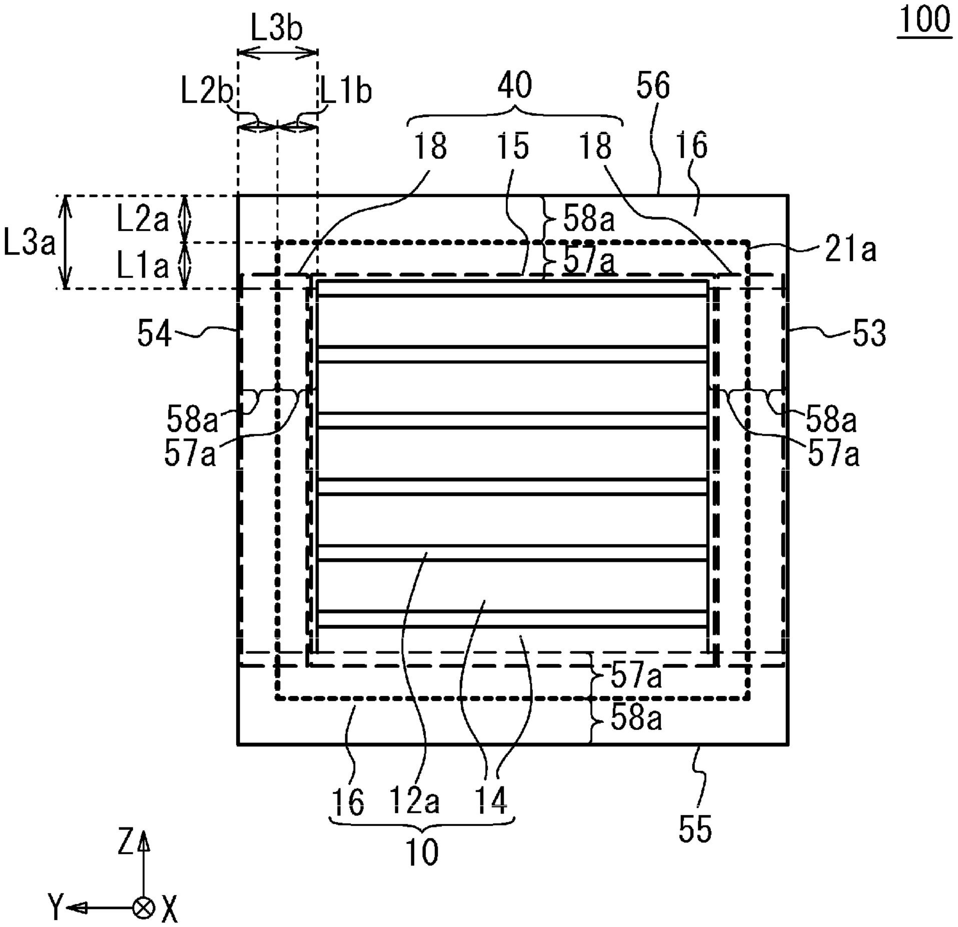
FIG. 4 is a diagram of a first surface of FIG. 1 seen through an external electrode.
Figure 5:
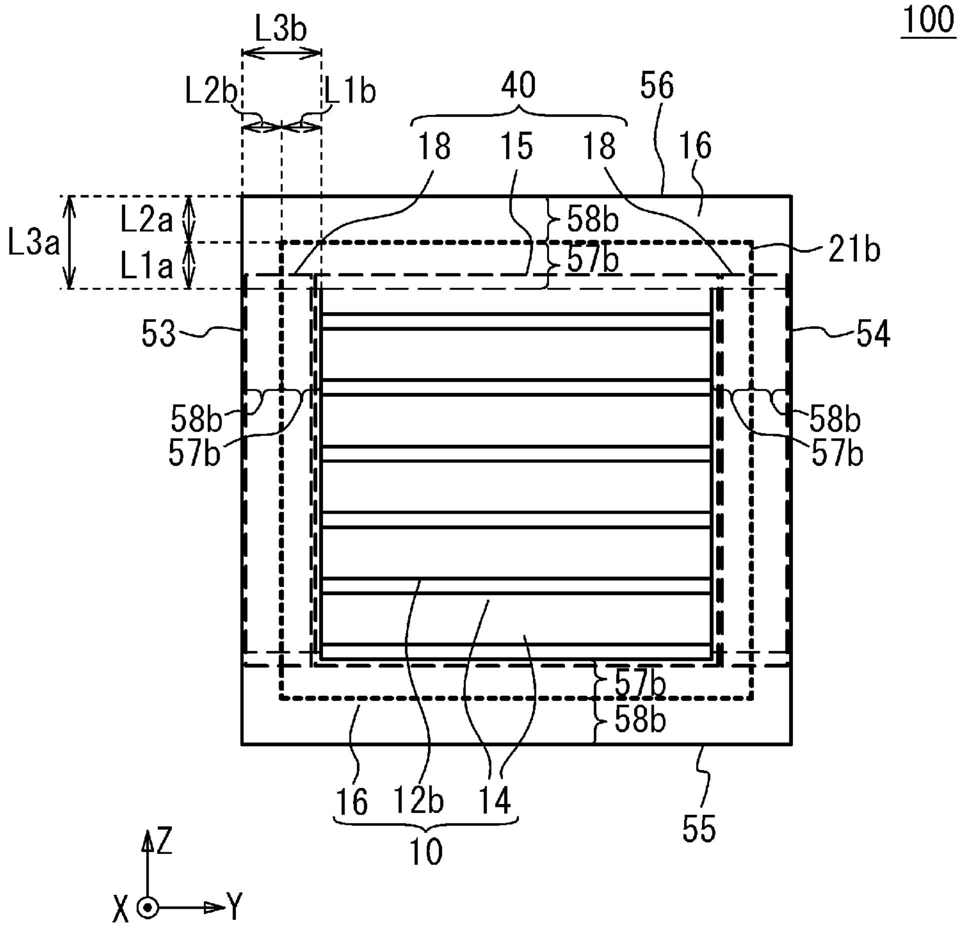
FIG. 5 is a diagram of a second surface of FIG. 1 seen through an external electrode.

(Embodiment) FIG. 1 is a partially sectional perspective view of a multilayer ceramic capacitor 100 according to an embodiment. FIG. 2 is a cross-sectional view taken along a line A-A in FIG. 1. FIG. 3 is a cross-sectional view taken along a line B-B in FIG. 1. FIG. 4 is a diagram of a first surface of FIG. 1 seen through the external electrode. FIG. 5 is a diagram of a second surface of FIG. 1 seen through the external electrode. In FIG. 4 and FIG. 5, regions where metal layers 21*a* and 21*b* are provided are indicated by thick dotted lines.

In FIG. 1 to FIG. 5, a Z direction (first direction) is a stacking direction in which dielectric layers 14 and internal electrodes 12*a* and 12*b* are stacked, and a fifth surface 55 and a sixth surface 56 of an element body 10 face each other. An X direction (second direction) is a length direction of the element body 10, and is the direction in which a first surface 51 and a second surface 52 of the element body 10 face each other. A Y direction (third direction) is a width direction of the internal electrodes 12*a* and 12*b*, and is the direction in which a third surface 53 and a fourth surface 54 of the element body 10 face each other. The X direction, the Y direction, and the Z direction are orthogonal to each other.

The multilayer ceramic capacitor 100 includes the element body 10 having a substantially rectangular parallelepiped shape, and external electrodes 20*a* and 20*b*.

The element body 10 has the plurality of dielectric layers 14, the plurality of internal electrodes 12*a* and 12*b*, and cover dielectric layers 16. The plurality of internal electrodes 12*a* and the plurality of internal electrodes 12*b* are alternately stacked in the Z direction. One of the plurality of dielectric layers 14 is provided between one of the plurality of internal electrodes 12*a* and one of the plurality of internal electrodes 12*b*. The outermost layers in the stacking direction (Z direction) of a multilayer body 40 in which the dielectric layer 14 and the internal electrodes 12*a* and 12*b* are stacked are the internal electrodes 12*a* and 12*b*. The pair of cover dielectric layers 16 are provided to sandwich the multilayer body 40 in the Z direction of the multilayer body 40. A section where the internal electrodes 12*a* and 12*b* face each other with the dielectric layer 14 in between is a capacity section 15. The sections sandwiching the capacity section 15 in the X direction of the element body 10 in FIG. 2 are a pair of end margin sections 42. The sections sandwiching the capacity section 15 in the Y direction in FIG. 3 to FIG. 5 are a pair of side margin sections 18.

The internal electrodes 12*a* and 12*b* are alternately exposed on the first surface 51 and the second surface 52. The internal electrodes 12*a* are exposed from the first surface 51, but the internal electrodes 12*b* are not exposed from the first surface 51. The internal electrodes 12*b* are exposed from the second surface 52, but the internal electrodes 12*a* are not exposed from the second surface 52. That is, each of the internal electrodes 12*a* and 12*b* is connected to each of the different one of the first surface 51 and the second surface 52.

As illustrated in FIG. 2, FIG. 4, and FIG. 5, the external electrodes 20*a* (and 20*b*) (a pair of external electrodes) include the metal layer 21*a* (and 21*b*) (first metal layer) and a metal layer 22*a* (and 22*b*) (second metal layer). On the first surface 51 (and the second surface 52), a portion that surrounds the internal electrode 12*a* (and 12*b*) and is located on the side of the internal electrodes 12*a* (and 12*b*) of the cover dielectric layer 16 and the side margin section 18 is a portion 57*a* (and 57*b*) (first portion). A portion of the cover dielectric layer 16 and the side margin section 18 other than the portion 57*a* (and 57*b*) is a portions 58*a* (and 58*b*) (second portions). The metal layer 21*a* (and 21*b*) contacts the internal electrode 12*a* (and 12*b*), covers and contacts the portion 57*a* (and 57*b*), respectively, and does not cover the portion 58*a* (and 58*b*), respectively.

The metal layer 22*a* (and 22*b*) covers the metal layer 21*a* (and 21*b*) and covers and contacts the portion 58*a* (and 58*b*) at the first surface 51 (and the second surface 52). The metal layer 22*a* (and 22*b*) is not provided on the third surface 53 and the fourth surface 54.

The size of the multilayer ceramic capacitor 100 is, for example, a length (length in the X direction) of 0.25 mm, a width (width in the Y direction) of 0.125 mm, and a height (height in the Z direction) of 0.125 mm, or 0.4 mm in length, 0.2 mm in width, and 0.2 mm in height, or 0.6 mm in length, 0.3 mm in width, and 0.3 mm in height, or 1.0 mm in length, 0.5 mm in width, and 0.5 mm in height, or 3.2 mm in length, 1.6 mm in width, and 1.6 mm in height, or 4.5 mm in length, 3.2 mm in width, and 2.5 mm in height. The size of the multilayer ceramic capacitor 100 is not to limited to these sizes.

The width of the side margin section 18 in the Y direction is, for example, 10 μm to 30 μm. The length of the end margin section 42 in the X direction is, for example, 10 μm to 50 μm.

The internal electrodes 12*a* and 12*b* are mainly composed of base metals such as nickel (Ni), copper (Cu), or tin (Sn). As the internal electrodes 12*a* and 12*b*, noble metals such as platinum (Pt), palladium (Pd), silver (Ag), or gold (Au), or alloys containing these metals may be used. The thickness of the internal electrodes 12*a* and 12*b* is, for example, 0.1 μm or more and 1 μm or less.

The dielectric layer 14 has, for example, a ceramic material having a perovskite structure represented by the general formula $ABO_3$ as a main phase. Note that the perovskite structure includes $ABO_{3-\alpha}$ that deviates from the stoichiometric composition. For example, the ceramic materials is at least one of barium titanate ($BaTiO_3$), calcium zirconate ($CaZrO_3$), calcium titanate ($CaTiO_3$), strontium titanate ($SrTiO_3$), magnesium titanate ($MgTiO_3$), and $Ba_{1-x-y}Ca_xSr_yTi_{1-z}Zr_2O_3$ ($0 \leq x \leq 1$, $0 \leq y \leq 1$, $0 \leq z \leq 1$). $Ba_{1-x-y}Ca_xSr_yTi_{1-z}Zr_2O_3$ is such as barium strontium titanate, barium calcium titanate, barium zirconate, barium zirconate titanate, calcium zirconate titanate, and barium calcium zirconate titanate. For example, the dielectric layer 14 contains 90 atomic percent or more of ceramic as the main component. The thickness of the dielectric layer 14 is, for example, 2 μm or more and 5 μm or less.

Additives may be added to the dielectric layer 14. Additives to the dielectric layer 14 may be an oxide of such as zirconium (Zr), hafnium (Hf), magnesium (Mg), manganese (Mn), molybdenum (Mo), vanadium (V), chromium (Cr), or a rare earth elements (Y (yttrium), samarium (Sm), europium (Eu), gadolinium (Gd), terbium (Tb), dysprosium (Dy), holmium (Ho), erbium (Er), thulium (Tm) and ytterbium (Yb)) or oxides containing cobalt (Co), nickel (Ni), lithium (Li), boron (B), sodium (Na), potassium (K) or silicon (Si), or a glass containing cobalt, nickel, lithium, boron, sodium, potassium or silicon.

The composition of the main component ceramic of the cover dielectric layer 16 may be the same as or different from the main component ceramic of the dielectric layer 14. The side margin section 18 may be a side dielectric layer different from the dielectric layer 14. In this case, the composition of the main component ceramic of the side dielectric layer may be the same as or different from that of the main component ceramic of the dielectric layer 14.

The metal layers 21*a* and 21*b* of the external electrodes 20*a* and 20*b* are mainly made of metals such as copper, nickel, aluminum (Al), and Zn (zinc), or an alloy of two or more of these (for example, an alloy of copper and nickel). The metal layers 21*a* and 21*b* may contain a glass component for densifying the metal layers 21*a* and 21*b*. When firing the metal layers 21*a* and 21*b*, a ceramic such as a co-material for controlling the sinterability of the metal layers 21*a* and 21*b* is included. The glass component is an oxide of barium (Ba), strontium (Sr), calcium (Ca), zinc, aluminum, silicon, or boron. The co-material is, for example, a ceramic component whose main component is the same material as the main component of the dielectric layer 14.

In the external electrodes 20*a* and 20*b*, the metal layers 22*a* and 22*b* contain tin or the like as a main component. The metal layers 22*a* and 22*b* are softer than the metal layers 21*a* and 21*b*. That is, the Young's modulus of the metal layers 22*a* and 22*b* is smaller than the Young's modulus of the metal layers 21*a* and 21*b*.

Figure 6:
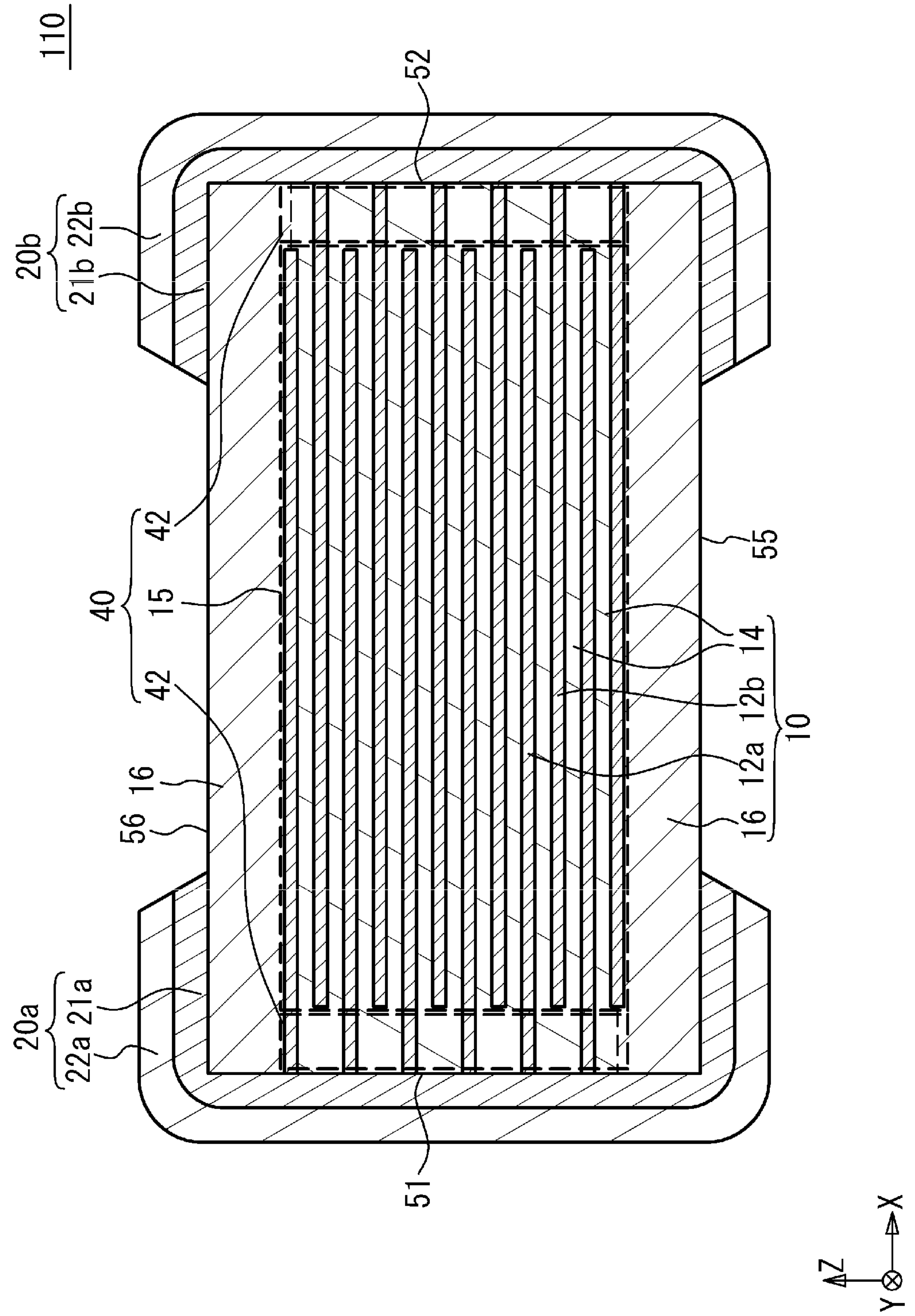
FIG. 6 is a cross-sectional view corresponding to an A-A cross section in FIG. 1 of a multilayer ceramic capacitor of a comparative object 1.

FIG. 6 is a cross-sectional view corresponding to the A-A cross section in FIG. 1 of the multilayer ceramic capacitor of a comparative object 1. As illustrated in FIG. 6, in the multilayer ceramic capacitor 110 of the comparative object 1, the external electrode 20*a* is provided at each end of the first surface 51, the third surface 53, the fourth surface 54, the fifth surface 55, and the sixth surface 56. The external electrode 20*b* is provided at each end of the second surface 52, the third surface 53, the fourth surface 54, the fifth surface 55, and the sixth surface 56. The metal layers 22*a* and 22*b* are respectively provided on the metal layers 21*a* and 21*b*. The metal layers 22*a* and 22*b* are not provided in contact with the first surface 51 and the second surface 52, respectively.

Figure 7:
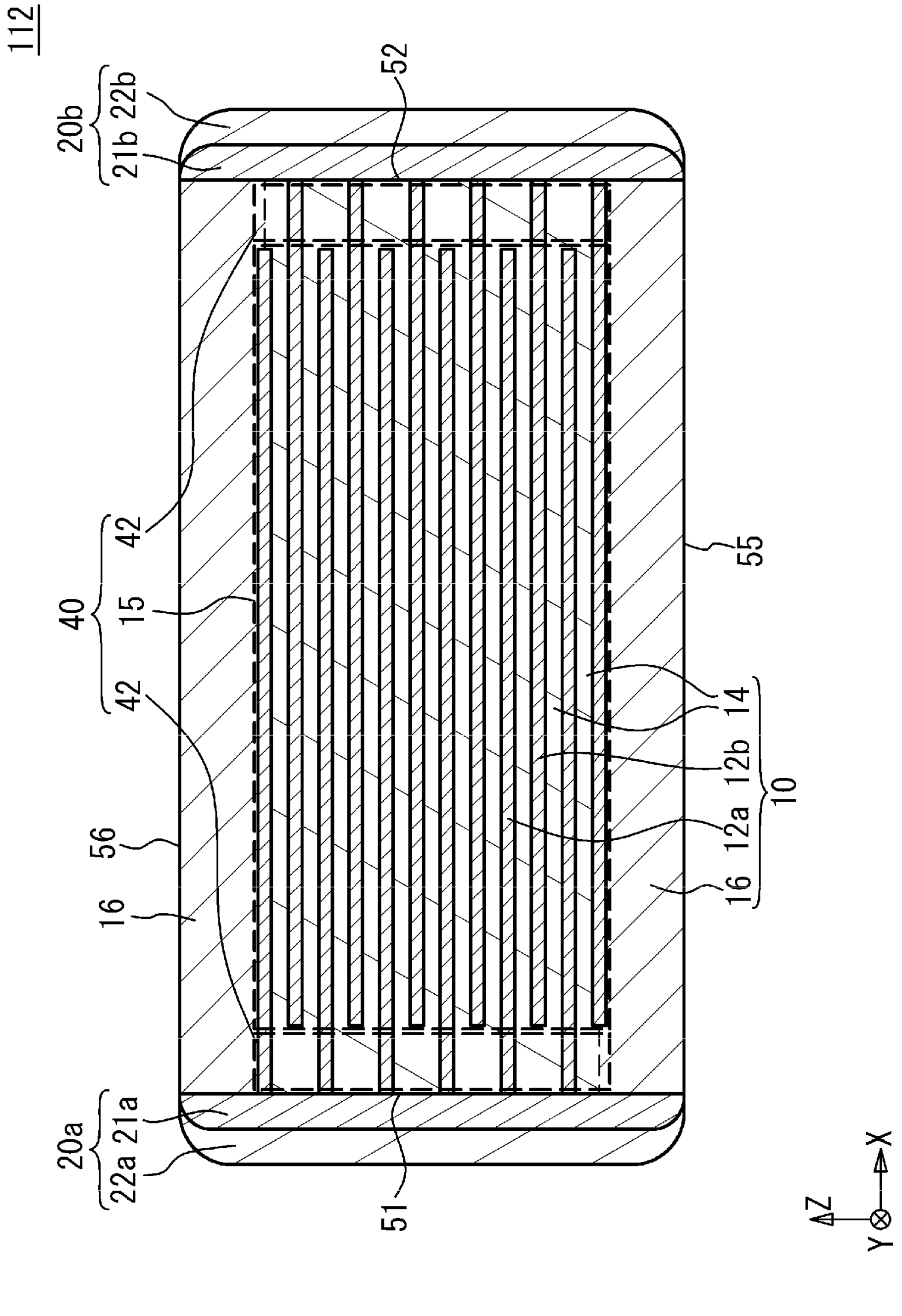
FIG. 7 is a cross-sectional view corresponding to an A-A cross section in FIG. 1 of a multilayer ceramic capacitor of a comparative object 2.

FIG. 7 is a cross-sectional view corresponding to the A-A cross section in FIG. 1 of the multilayer ceramic capacitor of a comparative object 2. As illustrated in FIG. 7, in a multilayer ceramic capacitor 112 of the comparative object 2, the external electrodes 20*a* and 20*b* are respectively provided on the first surface 51 and the second surface 52, and are not provided on the third surface 53, the fourth surface 54, the fifth surface 55 and the sixth surface 56. The metal layers 21*a* and 21*b* are provided on the entire first surface 51 and the entire second surface 52, and the metal layers 22*a* and 22*b* are provided in contact with the first surface 51 and the second surface 52 outside of the metal layers 21*a* and 21*b*.

Figure 8A:
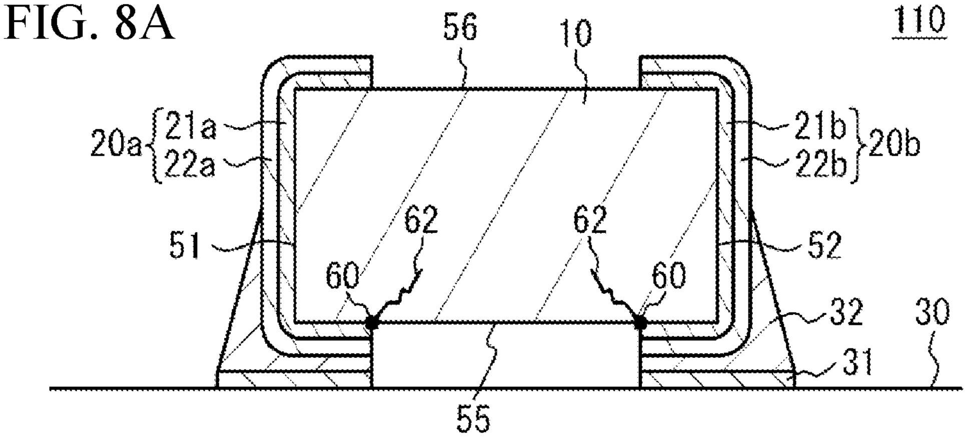
FIG. 8A and FIG. 8B are diagrams when multilayer ceramic capacitors of comparative objects 1 and 2 are mounted on a mounting board.
Figure 8B:
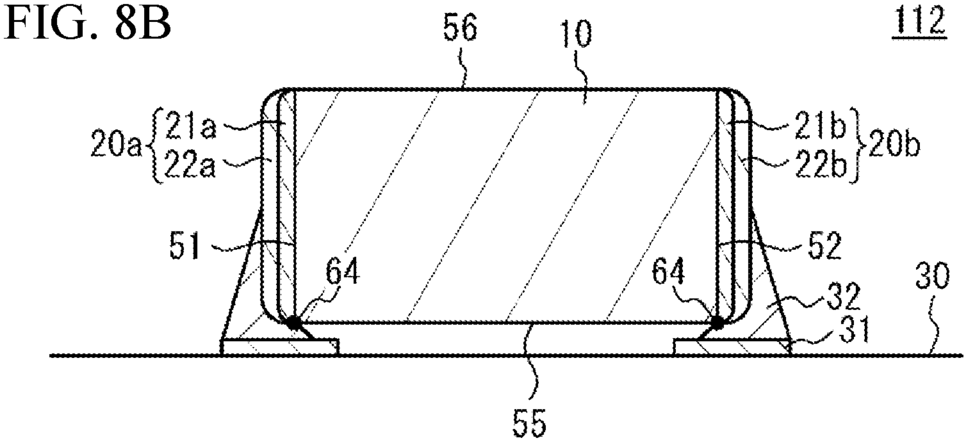
Figure 8C:
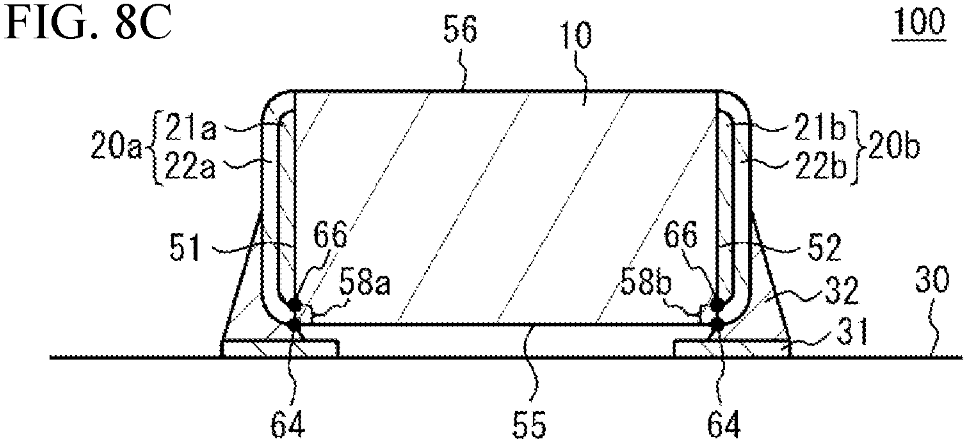
FIG. 8C is a diagram of a multilayer ceramic capacitor of an embodiment mounted on a mounting board.

FIG. 8A and FIG. 8B are diagrams when the multilayer ceramic capacitors of the comparative objects 1 and 2 are mounted on a mounting board, and FIG. 8C is a diagram of the multilayer ceramic capacitor of the embodiment mounted on a mounting board. As illustrated in FIG. 8A, the multilayer ceramic capacitor 110 of comparative object 1 is mounted on a land 31 on a mounting board 30. The external electrodes 20*a* and 20*b* and the land 31 are joined by a joining material 32 such as solder. When thermal stress is applied to the element body 10 due to the difference in linear expansion coefficient between the mounting board 30 and the element body 10, the stress is concentrated at end portions 60 of the external electrodes 20*a* and 20*b* on the fifth surface 55. This may cause cracks 62 to occur in the element body 10.

As illustrated in FIG. 8B, in the multilayer ceramic capacitor 112 of the comparative 2, the external electrodes 20*a* and 20*b* are not provided on the fifth surface 55, so stress concentration on the fifth surface 55 of the element body 10 is reduced. However, end portions 64 where the external electrodes 20*a* and 20*b* contact the first surface 51 are the ends of the metal layers 21*a* and 21*b*. Since the metal layers 21*a* and 21*b* are hard metals, if stress is concentrated at the portions 64, the metal layers 21*a* and 21*b* may peel off from the element body 10.

As illustrated in FIG. 8C, in the multilayer ceramic capacitor 100, the metal layers 22*a* and 22*b* cover the portions 58*a* and 58*b* of the first surface 51 and the second surface 52 that are not covered by the metal layers 21*a* and 21*b*. The metal layers 22*a* and 22*b* are softer than the metal layers 21*a* and 21*b*. Therefore, even if stress is concentrated at the portion 64, the metal layers 22*a* and 22*b* are less likely to peel off from the element body 10 than in the multilayer ceramic capacitor 112 of the comparative object 2. Since stress is less likely to be concentrated at portions 66 at the ends of the metal layers 21*a* and 21*b* than at the portions 64, the metal layers 21*a* and 21*b* are less likely to peel off from the element body 10.

Figure 9:
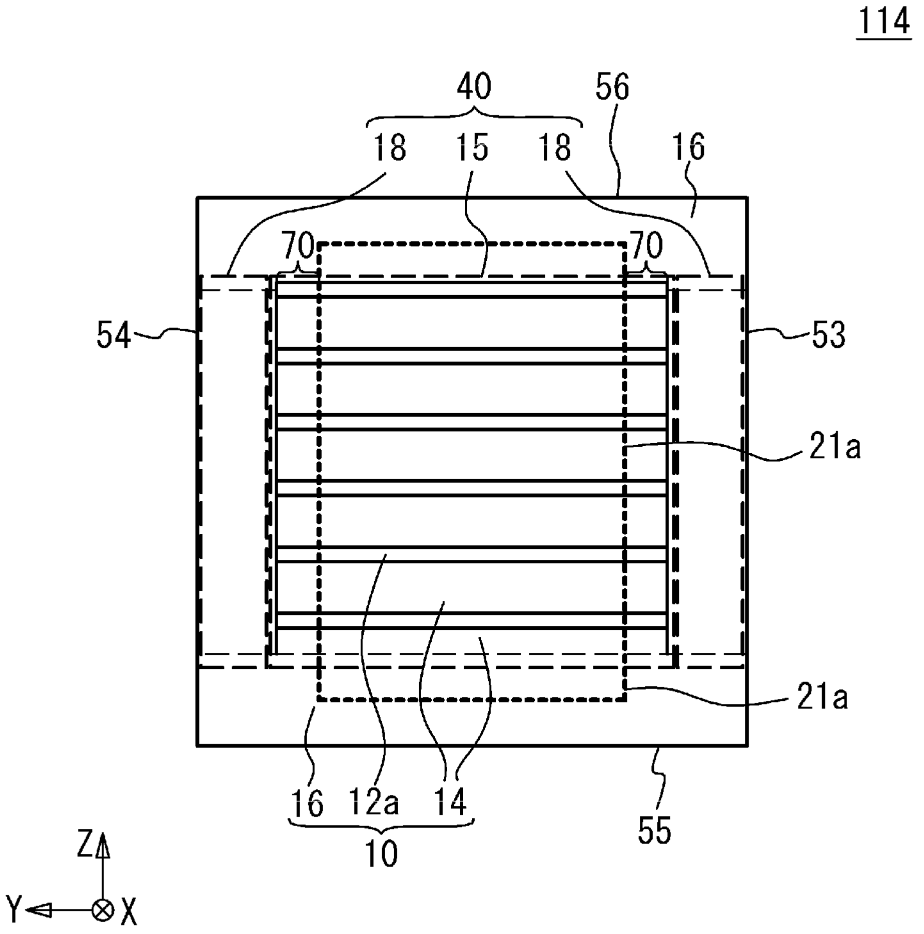
FIG. 9 is a diagram of a first surface of a multilayer ceramic capacitor of a comparative object 3, seen through an external electrode.

FIG. 9 is a diagram of the first surface of the multilayer ceramic capacitor of a comparative object 3, seen through the external electrode. The region where the metal layer 21*a* is provided is indicated by a thick broken line. As illustrated in FIG. 9, in a multilayer ceramic capacitor 114 of the comparative object 3, the metal layer 21*a* does not cover an end region 70 of the internal electrode 12*a* in the Y direction. Thereby, the metal layer 22*a* contacts the internal electrode 12*a* in the region 70. If the contact resistance between the metal layer 22*a* and the internal electrode 12*a* is high, the contact resistance between the external electrode 20*a* and the internal electrode 12*a* will be high.

As illustrated in FIG. 4 and FIG. 5, in the multilayer ceramic capacitor 100 of the embodiment, the metal layers 21*a* and 21*b* contact the internal electrodes 12*a* and 12*b* and cover the portions 57*a* and 57*b*. Thereby, the contact resistance between the external electrode 20*a* and the internal electrode 12*a* can be reduced.

Figure 10:
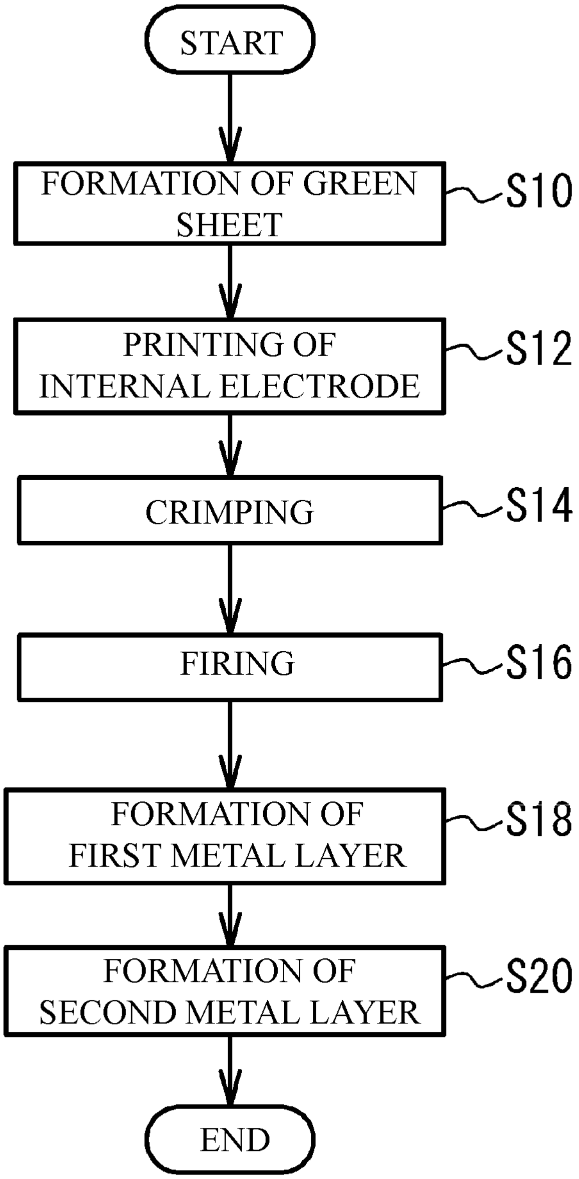
FIG. 10 is a flowchart of an example of a manufacturing process of a multilayer ceramic capacitor.

(Manufacturing method of multilayer ceramic capacitor) A method for manufacturing the multilayer ceramic capacitor 100 will be described. FIG. 10 is a flowchart of an example of the manufacturing process of a multilayer ceramic capacitor.

(Green sheet forming process) First, a green sheet is formed (step S10). In step S10, for example, a dielectric material obtained by adding various additive compounds (sintering aids, and so on) to ceramic powder is mixed with a binder such as polyvinyl butyral (PVB) resin and an organic solvent such as ethanol or toluene and a plasticizer are added and wet mixed. Using the obtained slurry, a green sheet is coated onto a substrate using, for example, a die coater method or a doctor blade method, and then dried. The base material is, for example, a PET (polyethylene terephthalate) film.

(Internal electrode printing process) Next, internal electrodes are printed on the green sheet (step S12). In step S12, a metal conductive paste for forming internal electrodes containing an organic binder is printed on the green sheet on the base material using, for example, a gravure printing method. As a result, a plurality of internal electrode patterns corresponding to the internal electrodes 12*a* and 12*b* are formed on the green sheet while being separated from each other. Ceramic particles are added to the metal conductive paste as a co-material. Although the main component of the ceramic particles is not particularly limited, it is preferable that the main component is the same as the main component ceramic of the dielectric layer 14.

(Crimp process) Subsequently, the green sheets are stacked and pressed together (step S14). In step S14, a multilayer sheet is formed by stacking green sheets on which internal electrode patterns to become the internal electrodes 12*a* and 12*b* are printed. Green sheets corresponding to the cover dielectric layer 16 are stacked on both end faces of the stacked sheet in the stacking direction. Subsequently, the plurality of green sheets are crimped together by applying pressure to the multilayer sheet. As the crimping means, for example, a hydrostatic press is used. Subsequently, a plurality of the element bodies 10 are formed by cutting the multilayer sheet along predetermined cut lines in the stacking direction using a cutting blade.

(Firing process) Subsequently, the element body 10 is fired (step S16). In step S16, the element body 10 is subjected to a binder removal treatment in a nitrogen gas atmosphere at 250° C. to 500° C., and then fired at 1300° C. to 1400° C. for about 1 hour in a reducing atmosphere. As a result, each grain in the element body 10 and side dielectric layers 18*a* and 18*b* is sintered.

(First metal layer formation step) Subsequently, the metal layers 21*a* and 21*b* are formed (step S18). Step S18 will be described below with reference to FIG. 11A to FIG. 12B.

Figure 11A:
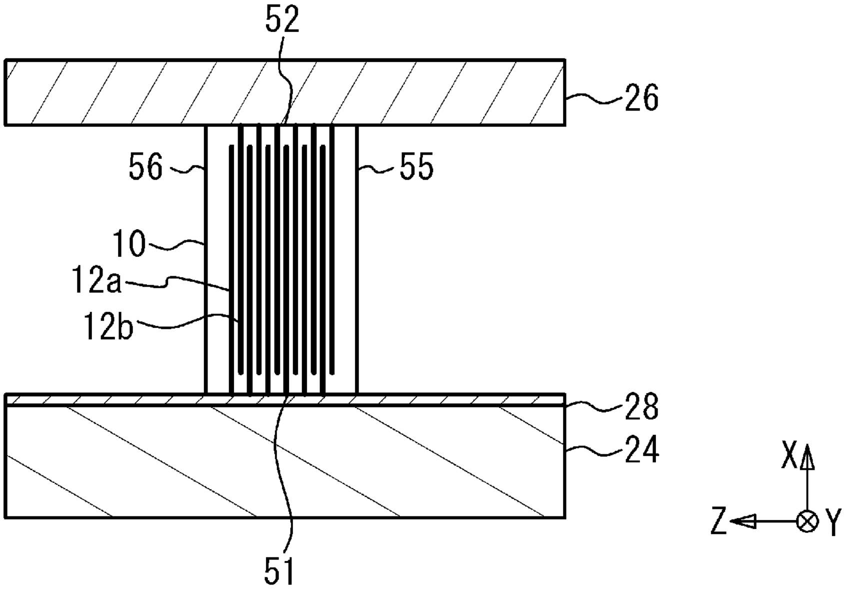
FIG. 11A to FIG. 11C are cross-sectional views of a method for manufacturing a multilayer ceramic capacitor according to an embodiment.

FIG. 11A to FIG. 12C are cross-sectional views of a method for manufacturing a multilayer ceramic capacitor according to an embodiment. As illustrated in FIG. 11A, a metal sheet 28 is placed on a flat elastic body 24. The metal sheet 28 is arranged to cover the first surface 51. A tape 26 is pasted onto the second surface 52 of the element body 10.

Figure 11B:
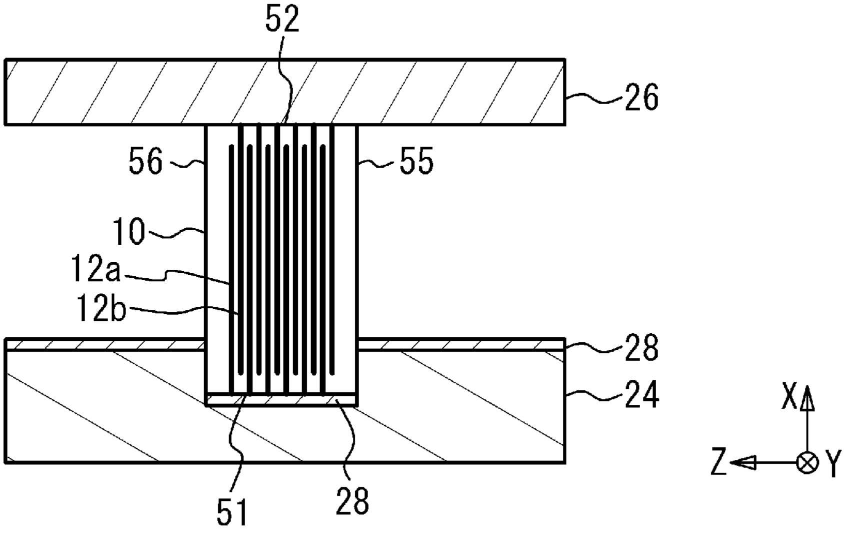

Subsequently, as illustrated in FIG. 11B, the tape 26 is pressed downward (in the −X direction) by a pressing device (not illustrated). As a result, the first surface 51 of the element body 10 is pressed against the surface of the metal sheet 28. At this time, the pressed portion of the metal sheet 28 is depressed by the pressure from the element body 10, and the elastic body 24 below the element body 10 is also depressed. The recessed portion of the metal sheet 28 is pressed against the first surface 51 of the element body 10 by the restoring force from the elastic body 24. As a result, a portion of the metal sheet 28 sticks to the first surface 51. At this time, the metal sheets 28 are stuck along the corners of the element body 10 at both ends of the first surface 51 in the stacking direction (Z direction). Thereafter, when the pressing force of the element body 10 increases, a shearing force is generated between the stuck part of the metal sheet 28 and the other parts, so that the stuck part and the other parts are separated from each other.

Figure 11C:
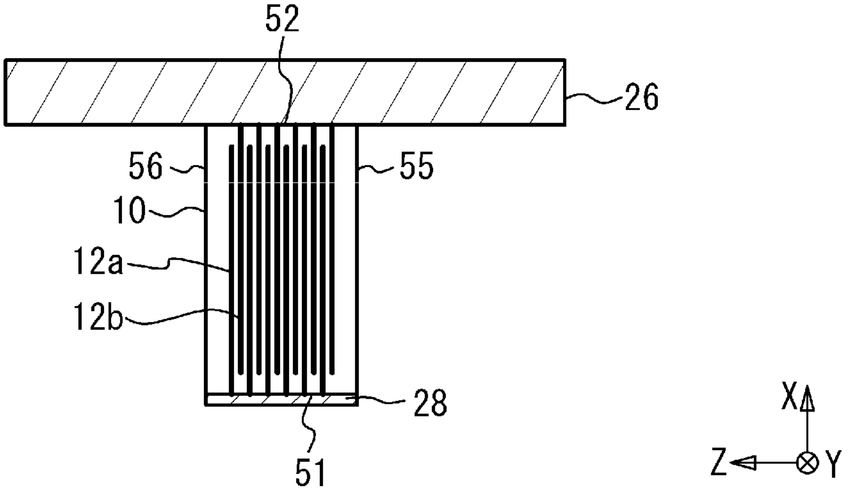

Subsequently, as illustrated in FIG. 11C, the tape 26 is moved upward (in the +X direction) by a pressing device (not illustrated). As a result, the element body 10 moves away from the elastic body 24. At this time, the separated portion of the metal sheet 28 sticks to the first surface 51 of the element body 10.

Figure 12A:
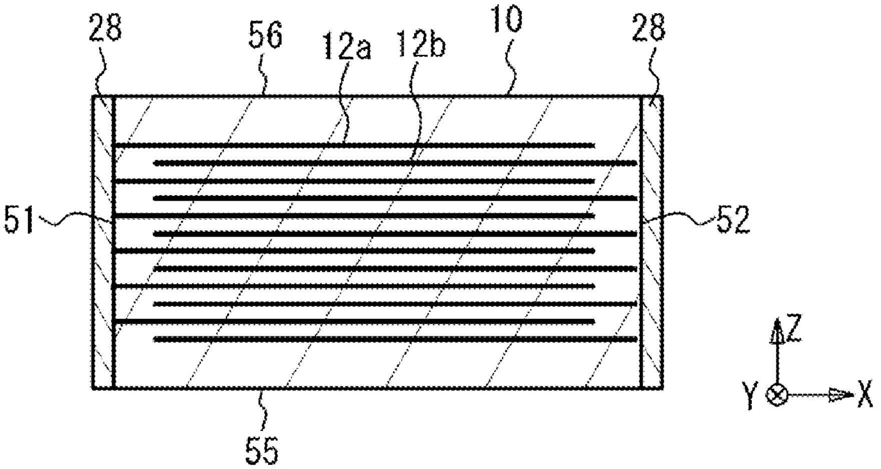
FIG. 12A to FIG. 12C are cross-sectional views of a method for manufacturing a multilayer ceramic capacitor according to an embodiment.

Subsequently, the metal sheet 28 is attached to the second surface 52 of the element body 10 in the same manner as in FIG. 11A to FIG. 11C. As illustrated in FIG. 12A, the metal sheet 28 is attached to the entire surface of the first surface 51 and the second surface 52.

Figure 12B:
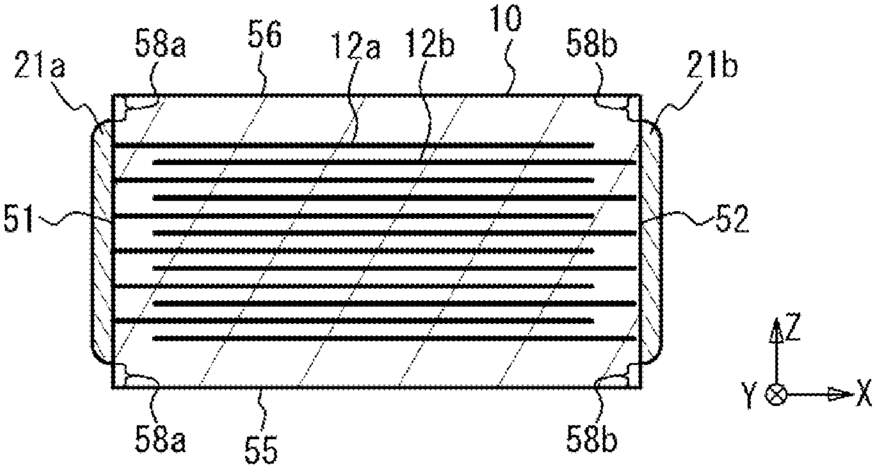

Subsequently, barrel polishing is performed as illustrated in FIG. 12B. As a result, the outer portion of the metal sheet 28 is polished, and the metal sheet 28 at the peripheral portions 58*a* and 58*b* of the first surface 51 and the second surface 52 is removed, forming the metal layers 21*a* and 21*b*. At this time, the corners of the element body 10 may be polished and the corners of the element body 10 may be rounded. By selecting the barrel polishing conditions, the metal sheet 28 can be polished more than the element body 10.

(Second metal layer forming step) Subsequently, the metal layers 22*a* and 22*b* are formed (step S20). Step S20 will be described below with reference to FIG. 12C.

Figure 12C:
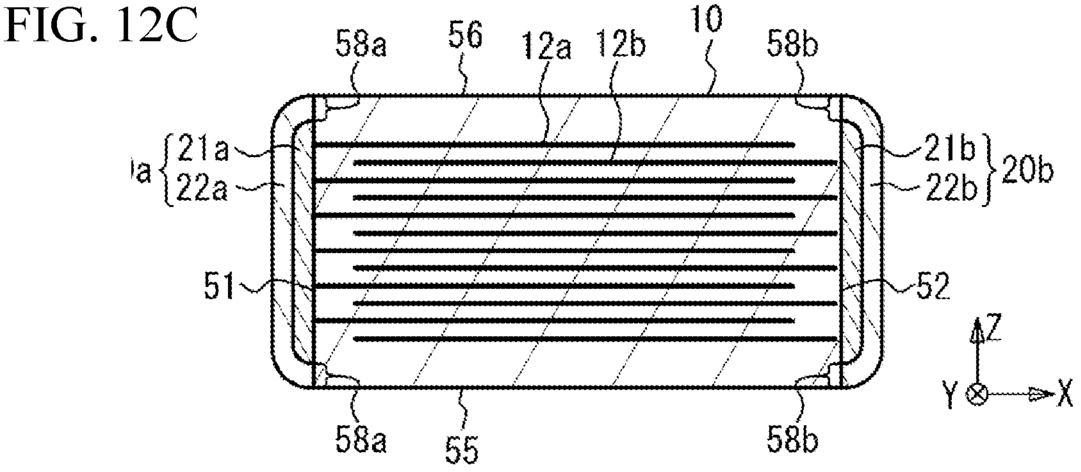

As illustrated in FIG. 12C, the metal layers 22*a* and 22*b* are formed on the surfaces of the metal layers 21*a* and 21*b* by plating the surfaces of the metal layers 21*a* and 21*b*. By appropriately selecting plating conditions, the metal layers 22*a* and 22*b* can be formed also on the end faces of the metal layers 21*a* and 21*b*, thereby forming the metal layers 22*a* and 22*b* in contact with the portions 58*a* and 58*b*. By appropriately selecting the plating time, the metal layers 22*a* and 22*b* can cover the entire surfaces of the portions 58*a* and 58*b*. After forming a thin seed layer on the surfaces of the metal layers 21*a* and 21*b* and the portions 58*a* and 58*b* by electroless plating or sputtering, the metal layers 22*a* and 22*b* may be formed on the surfaces of the seed layers by plating.

The metal layers 21*a* and 22*a* form the external electrode 20*a*, and the metal layers 21*b* and 22*b* form the external electrode 20*b*.

(Another example of external electrode formation process) Before the step of firing the element body 10 in step S16 of FIG. 10, a paste is applied as the metal sheet 28 to the first surface 51 and the second surface 52, as illustrated in FIG. 12A. Subsequently, firing in step S16 in FIG. 10 is performed. As illustrated in FIG. 12B, the metal sheet 28 contracts, and the portions 58*a* and 58*b* that are not covered by the metal layers 21*a* and 21*b* are formed at the peripheral edges of the first surface 51 and the second surface 52. Subsequently, the metal layers 22*a* and 22*b* are formed as illustrated in FIG. 12C. The external electrodes 20*a* and 20*b* may be formed in this manner. The method for forming the external electrodes 20*a* and 20*b* is not limited to the above method.

Figure 13A:
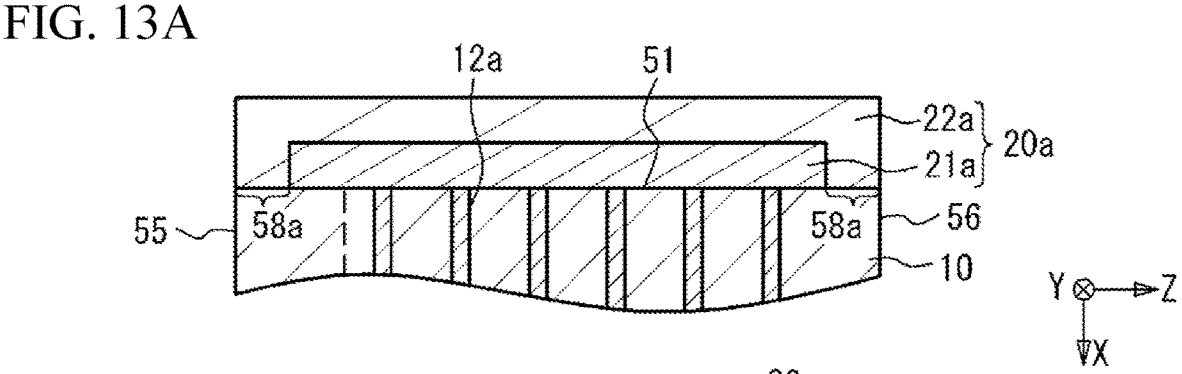
FIG. 13A to FIG. 13D are cross-sectional views of various examples of external electrodes in an embodiment.

(Example of external electrode) FIG. 13A to FIG. 13D are cross-sectional views of various examples of external electrodes in the embodiment. As illustrated in FIG. 13A, the metal layer 22*a* (and 22*b*) may completely cover the portion 58*a* (and the portion 58*b*).

Figure 13B:
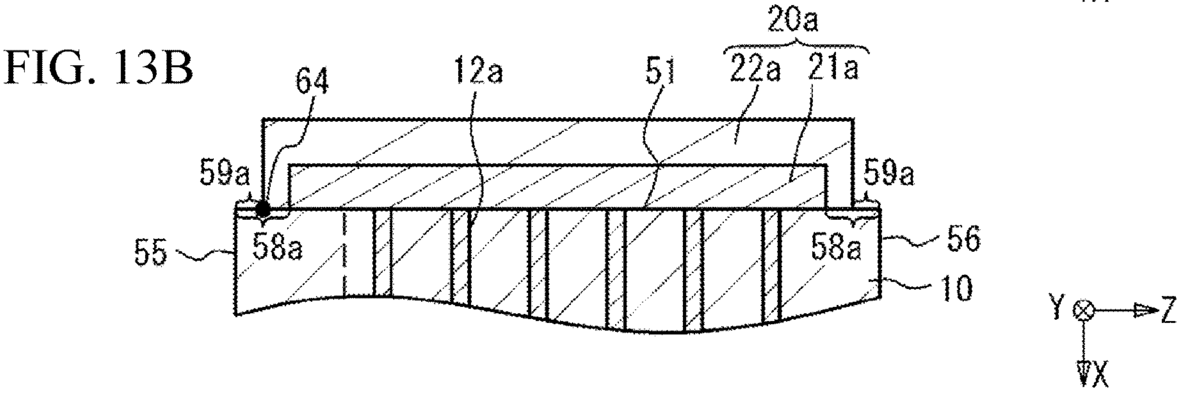
Figure 14:
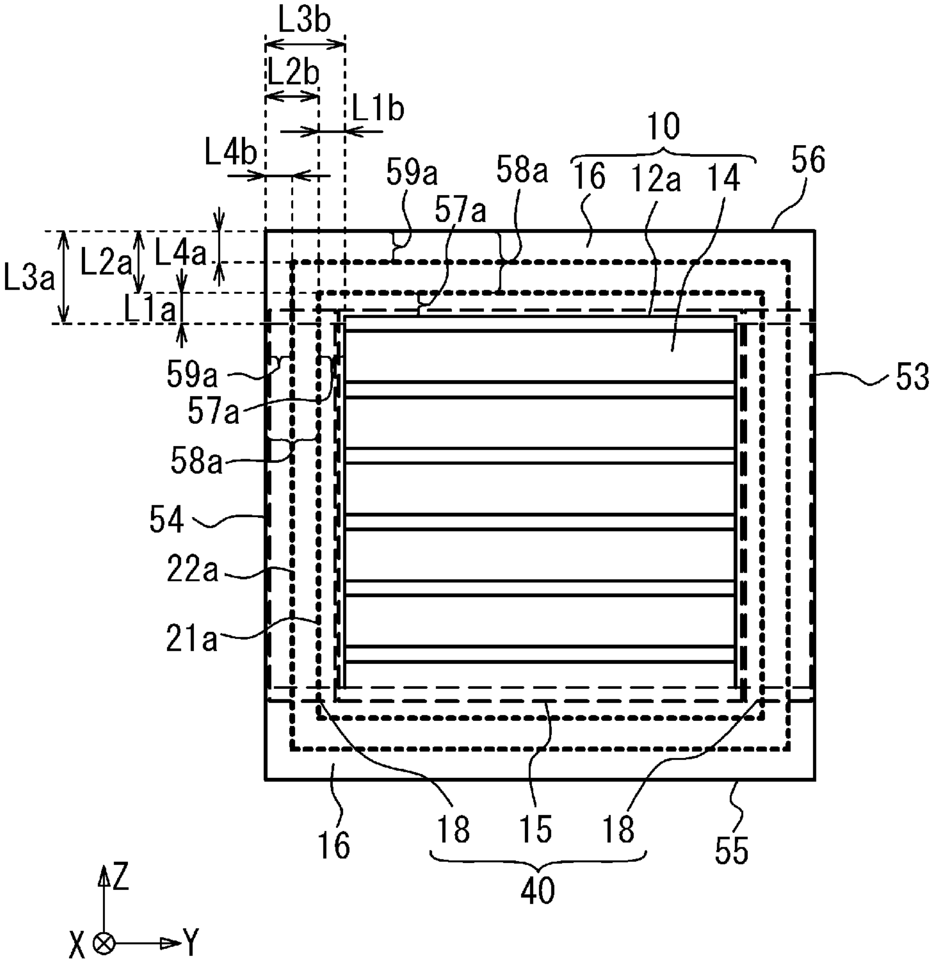
FIG. 14 is a diagram of a first surface of FIG. 13B seen through an external electrode.

FIG. 14 is a diagram of the first surface of FIG. 13B seen through the external electrode. The regions covered by the metal layers 21*a* and 22*a* are indicated by thick dotted lines. As illustrated in FIG. 13B and FIG. 14, the metal layer 22*a* (and 22*b*) may cover the inner portion of the portion 58*a* (and the portion 58*b*) and may not necessarily cover the outer portion 59*a*. In this case as well, since the soft metal layer 22*a* (and 22*b*) and the element body 10 are in contact with each other at the end portion 64 of the external electrode 20*a* (and 20*b*) where the stress is most concentrated, the metal layer 22*a* (and 22*b*)) can be suppressed from peeling off from the element body 10.

Figure 13C:
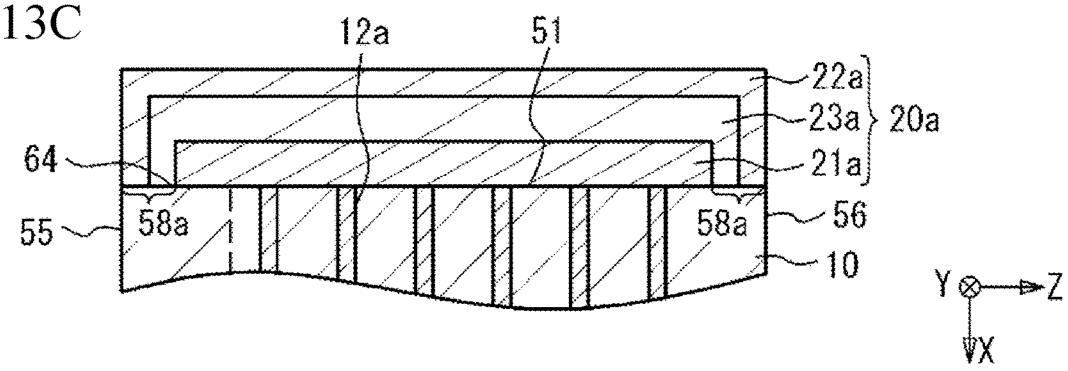

As illustrated in FIG. 13C, a metal layer 23*a* may be provided between the metal layer 22*a* (and 22*b*) and the metal layer 21*a* (and 21*b*). It is sufficient that the outermost metal layers 22*a* and 22*b* of the external electrodes 20*a* (and 20*b*) are softer than the metal layers 21*a* and 21*b* that contact the internal electrodes 12*a* (and 12*b*).

Figure 13D:
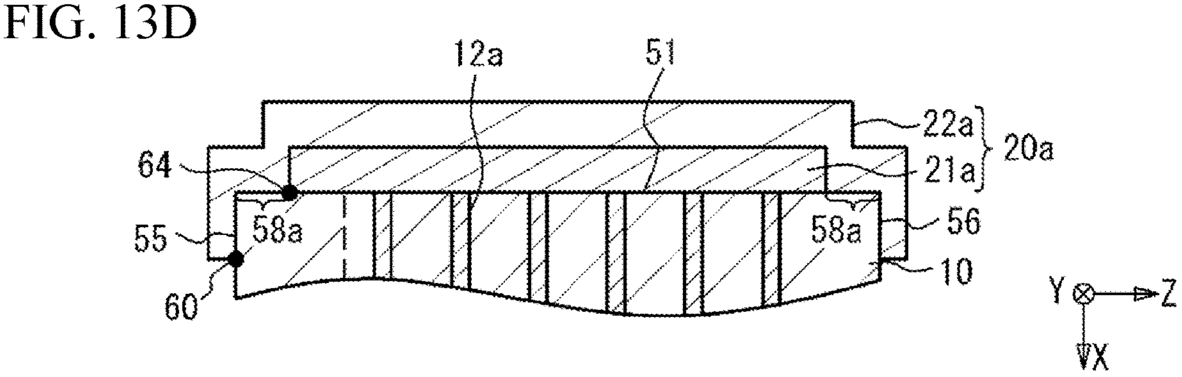

As illustrated in FIG. 13D, the metal layer 22*a* (and 22*b*) may cover the ends of the fifth surface 55 and the sixth surface 56. In this case as well, since the soft metal layer 22*a* (and 22*b*) and the element body 10 are in contact with each other at the end portion 60 of the external electrode 20*a* (and 20*b*) where the stress is most concentrated, the metal layer 22*a* (and 22*b*)) can be suppressed from peeling off from the element body 10. Furthermore, the occurrence of the cracks 62 as illustrated in FIG. 8A can be suppressed. Furthermore, since the end portions 64 of the metal layers 21*a* (and 21*b*)

are not provided at the corners of the element body 10, stress concentration at the portions 64 can be suppressed.

In FIG. 13A to FIG. 13D, the internal electrodes 12*a* (and 12*b*) have nickel as a main component, for example. The metal layer 21*a* (and 21*b*) has nickel or copper as a main component, for example. The metal layer 22*a* (and 22*b*) has tin as a main component, for example. The metal layer 23*a* is provided as a diffusion barrier layer when, for example, the metal layer 21*a* (and 21*b*) has copper as the main component and the metal layer 22*a* (and 22*b*) has tin as the main component, and the metal layer 23*a* has nickel as the main component.

As described above, in the embodiment, as illustrated in FIG. 2 and FIG. 4, the metal layer 21*a* (and 21*b*) covers the portion 57*a* (and 57*b*) but does not cover the portion 58*a* (and 58*b*). The metal layer 22*a* (and 22*b*) has a Young's modulus smaller than that of the metal layer 21*a* (and 21*b*), covers the metal layer 21*a* (and 21*b*), and covers at least a portion of the portion 58*a* (and 58*b*) on the metal layer 21*a* (and 21*b*) side in the first surface 51 (and the second surface 52). Thereby, as illustrated in FIG. 8C, defects such as cracks in the element body 10 or peeling of the external electrodes 20*a* and 20*b* can be suppressed. From the viewpoint of suppressing defects, the Young's modulus of the metal layer 22*a* (and 22*b*) is preferably ¾ or less, more preferably ½ or less, of the Young's modulus of the metal layer 21*a* (and 21*b*). The metal layers 21*a* and 21*b* are in contact with the entirety of internal electrodes 12*a* and 12*b* exposed on the first surface 51 and the second surface 52, respectively. Thereby, the contact resistance between the external electrodes 20*a* and 20*b* and the internal electrodes 12*a* and 12*b* can be reduced.

Soft metals have a low Young's modulus. The Young's moduli of nickel, copper and tin are 204 GPa, 130 GPa and 41 GPa, respectively. Therefore, the metal layers 21*a* and 21*b* have nickel or copper as the main component, and the metal layers 22*a* and 22*b* have tin as the main component. The metal layers 21*a* and 21*b* may contain a co-material such as nickel or copper. The metal layers 22*a* and 22*b* may be made of tin-based solder such as tin-silver-copper solder or tin-silver solder. Here, the main component allows other elements or compounds to be added intentionally or unintentionally, and for example, the content is 50 atomic % or more, 80 atomic % or more, and 90 atomic %. That's all.

As illustrated in FIG. 13D, the metal layers 22*a* and 22*b* of the external electrodes 20*a* and 20*b* may cover the ends of the third surface 53, the fourth surface 54, the fifth surface 55, and the sixth surface 56. However, the multilayer ceramic capacitor may become larger. Therefore, as illustrated in FIG. 13A to FIG. 13C, the external electrodes 20*a* (and 20*b*) do not cover surfaces other than the first surface 51 (and the second surface 52) of the element body 10. This allows the multilayer ceramic capacitor to be miniaturized.

As illustrated in FIG. 13A, the metal layer 22*a* (and 22*b*) may cover the first surface 51 (and the second surface 52) to the end, or as illustrated in FIG. 13B, the metal layer 22*a* (and 22*b*) does not need to cover at least a portion 59*a* (third portion) of the peripheral edge of the first surface 51 (and the second surface 52).

In FIG. 4 and FIG. 5, if the areas of the portions 58*a* and 58*b* are too large, when the alignment between the metal layers 21*a* and 21*b* and the internal electrodes 12*a* and 12*b* is misaligned, the internal electrodes 12*a* and 12*b* may be exposed from the metal layers 21*a* and 21*b*. From this viewpoint, the area of the portion 58*a* is preferably 9⁄10 or less, more preferably ⅘ or less of the total area of the portion 57*a* and the portion 58*a*. The area of the portion 58*b* is preferably 9⁄10 or less, more preferably ⅘ or less of the total area of the portions 57*b* and 58*b*.

If the areas of the portions 58*a* and 58*b* are too small, the end portions 66 of the metal layers 21*a* and 21*b* (see FIG. 8C) may be close to the end portions 64 of the first surface 51 and the second surface 52. In this case, stress concentration at the portion 66 becomes large, and there is a possibility that the metal layers 21*a* and 21*b* may peel off from the element body 10. From this viewpoint, the area of the portion 58*a* is preferably 1⁄10 or more, more preferably ⅕ or more of the total area of the portion 57*a* and the portion 58*a*. The area of the portion 58*b* is preferably 1⁄10 or more, more preferably ⅕ or more of the total area of the portions 57*b* and 58*b*.

As illustrated in FIG. 4 and FIG. 5, the width of the portions 57*a* and 57*b* in the side margin section 18 in the Y direction is L1*b*, the width of the portions 58*a* and 58*b* in the Y direction is L2*b*, and the width of the side margin section 18 in the Y direction is L3*b*. The width of the portions 57*a* and 57*b* in the cover dielectric layer 16 in the Z direction is L1*a*, the width of the portions 58*a* and 58*b* in the Z direction is L2*a*, and the width of the cover dielectric layer 16 in the Z direction is L3*a*.

From the viewpoint of not exposing the internal electrodes 12*a* (and 12*b*) from the metal layers 21*a* (and 21*b*), the width L1*a* (and L1*b*) is preferably 1⁄10 or more, and more preferably ⅕ or more of the width L3*a* (and L3*b*). From the viewpoint of suppressing peeling of the metal layer 21*a* (and 21*b*), the width L1*a* (and L1*b*) is preferably 9⁄10 or less, and more preferably ⅘ or less of the width L3*a* (and L3*b*), respectively.

In FIG. 14, if the widths L4*a* and L4*b* where the metal layer 22*a* is not provided are large, stress will be concentrated at the ends of the metal layer 21*a*, and the metal layer 21*a* will easily peel off from the element body 10. From this viewpoint, the widths L4*a* and L4*b* are preferably ½ or less, and more preferably ⅓ or less, of the widths L2*a* and L2*b*, respectively. The same applies to the second surface 52.

An example has been described in which both of the pair of external electrodes 20*a* and 20*b* include the first metal layers 21*a* and 21*b* and the second metal layers 22*a* and 22*b*. At least one of the external electrodes 20*a* and 20*b* may include the metal layers 21*a* and 21*b* and the metal layers 22*a* and 22*b* on at least one of the corresponding fifth surface 55 and the sixth surface 56.

Although the embodiments of the present invention have been described in detail, it is to be understood that the various change, substitutions, and alterations could be made hereto without departing from the spirit and scope of the invention.

What is claimed is:

1. A multilayer ceramic electronic device comprising:

an element body including a multilayer body in which a plurality of internal electrodes and a plurality of dielectric layers are alternately stacked in a first direction, a pair of cover dielectric layers sandwiching the multilayer body in the first direction, and a pair of end faces facing each other in a second direction to which the plurality of internal electrodes are alternately exposed, the plurality of dielectric layers including a pair of side margin sections sandwiching the plurality of internal electrodes in a third direction orthogonal to the first direction and the second direction; and a pair of external electrodes respectively covering each of the pair of end faces, wherein at least one of the pair of external electrodes includes a first metal layer and a second metal layer, wherein the first metal layer covers a part of the plurality of internal electrodes and a first portion of the pair of cover dielectric layers and the pair of side margin sections which is located on a side of the plurality of internal electrodes, does not cover a second portion of the pair of cover dielectric layers and the pair of the side margin section which is other than the first portion, contacts a part of the plurality of internal electrodes, and has a main component of nickel or copper, at a corresponding end face of the element body, and wherein the second metal layer covers the first metal layer, contacts at least a part of the second portion on a side of the first metal layer, and has a main component of tin, and the second metal layer does not cover a third portion which is at least a part of a peripheral portion of the corresponding end face so as to expose the third portion to outside of the multilayer ceramic electronic device.

2. The multilayer ceramic electronic device as claimed in claim 1, wherein an area of the first portion is 1/10 or more and 9/10 or less of an area of the second portion.

3. The multilayer ceramic electronic device as claimed in claim 1, wherein the at least one of the pair of external electrodes does not cover other faces other than the corresponding end face of the element body.

4. The multilayer ceramic electronic device as claimed in claim 1, wherein a width of the third portion is ½ or less of a width of the second portion.

5. The multilayer ceramic electronic device as claimed in claim 1, wherein both of the pair of external electrodes have the first metal layer and the second metal layer.

6. A multilayer ceramic electronic device comprising:

an element body including a multilayer body in which a plurality of internal electrodes and a plurality of dielectric layers are alternately stacked in a first direction, a pair of cover dielectric layers sandwiching the multilayer body in the first direction, and a pair of end faces facing each other in a second direction to which the plurality of internal electrodes are alternately exposed, the plurality of dielectric layers including a pair of side margin sections sandwiching the plurality of internal electrodes in a third direction orthogonal to the first direction and the second direction; and a pair of external electrodes respectively covering each of the pair of end faces, wherein at least one of the pair of external electrodes includes a first metal layer and a second metal layer, wherein the first metal layer covers a part of the plurality of internal electrodes and a first portion of the pair of cover dielectric layers and the pair of side margin sections which is located on a side of the plurality of internal electrodes, does not cover a second portion of the pair of cover dielectric layers and the pair of the side margin section which is other than the first portion, and contacts a part of the plurality of internal electrodes, at a corresponding end face of the element body, and wherein the second metal layer covers the first metal layer, contacts at least a part of the second portion on a side of the first metal layer, and has a Young's modulus smaller than that of the first metal layer, and the second metal layer does not cover a third portion which is at least a part of a peripheral portion of the corresponding end face so as to expose the third portion to outside of the multilayer ceramic electronic device.

7. The multilayer ceramic electronic device as claimed in claim 6, wherein a main component of the first metal layer is nickel or copper, and wherein a main component of the second metal layer is tin.

8. The multilayer ceramic electronic device as claimed in claim 6, wherein an area of the first portion is 1/10 or more and 9/10 or less of an area of the second portion.

9. The multilayer ceramic electronic device as claimed in claim 6, wherein the at least one of the pair of external electrodes does not cover other faces other than the corresponding end face of the element body.

10. The multilayer ceramic electronic device as claimed in claim 6, wherein a width of the third portion is ½ or less of a width of the second portion.

11. The multilayer ceramic electronic device as claimed in claim 6, wherein both of the pair of external electrodes have the first metal layer and the second metal layer.

* * * * *